Oct. 7, 1969     W. J. RIKER     3,471,026
CONTINUOUS ROTARY DISC FILTERS
Filed Dec. 9, 1966     10 Sheets-Sheet 1
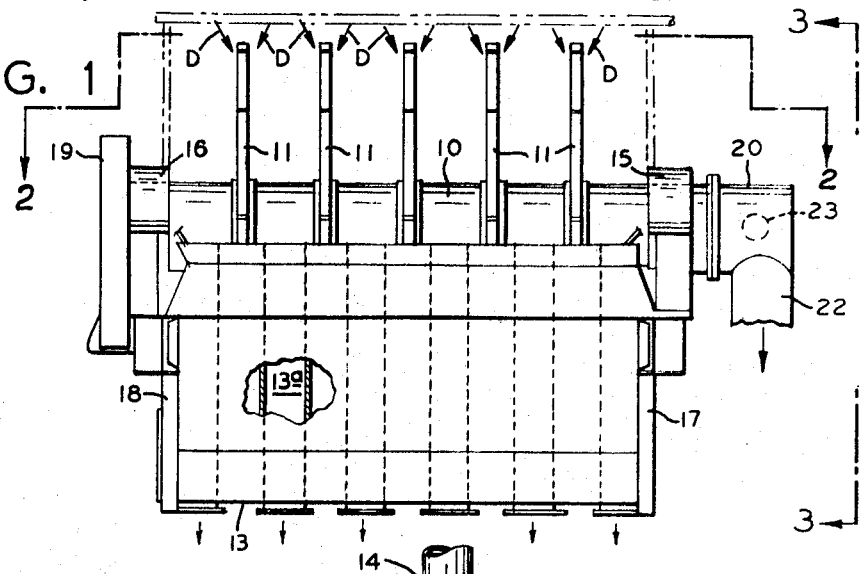
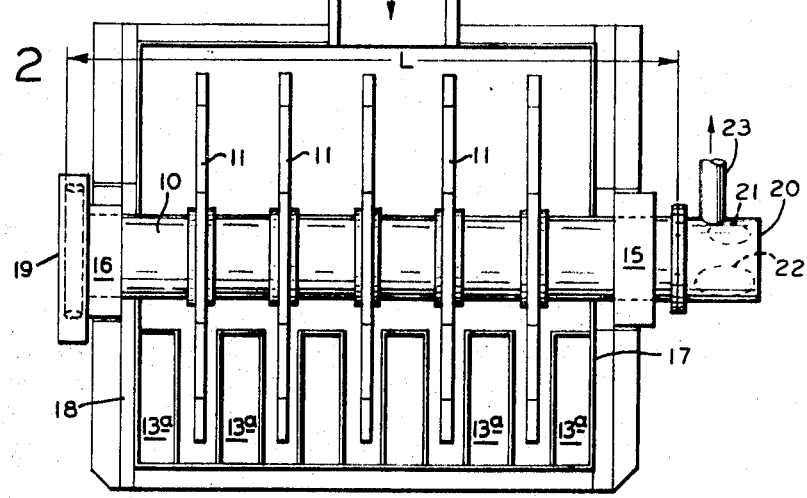
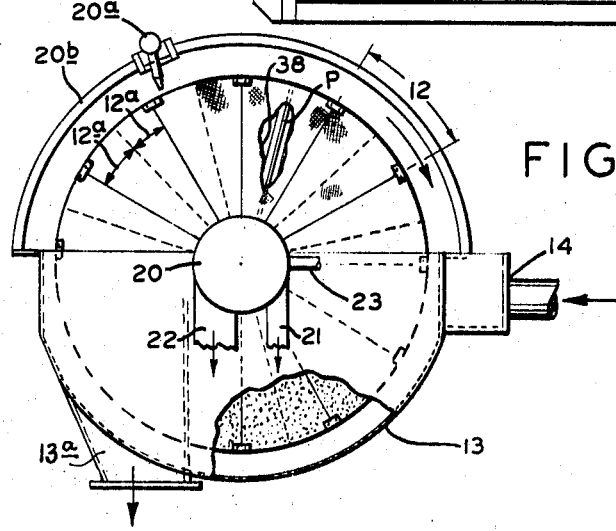
INVENTOR.
WALTER J. RIKER
BY *Theodore M. Jablon*
ATTORNEY.

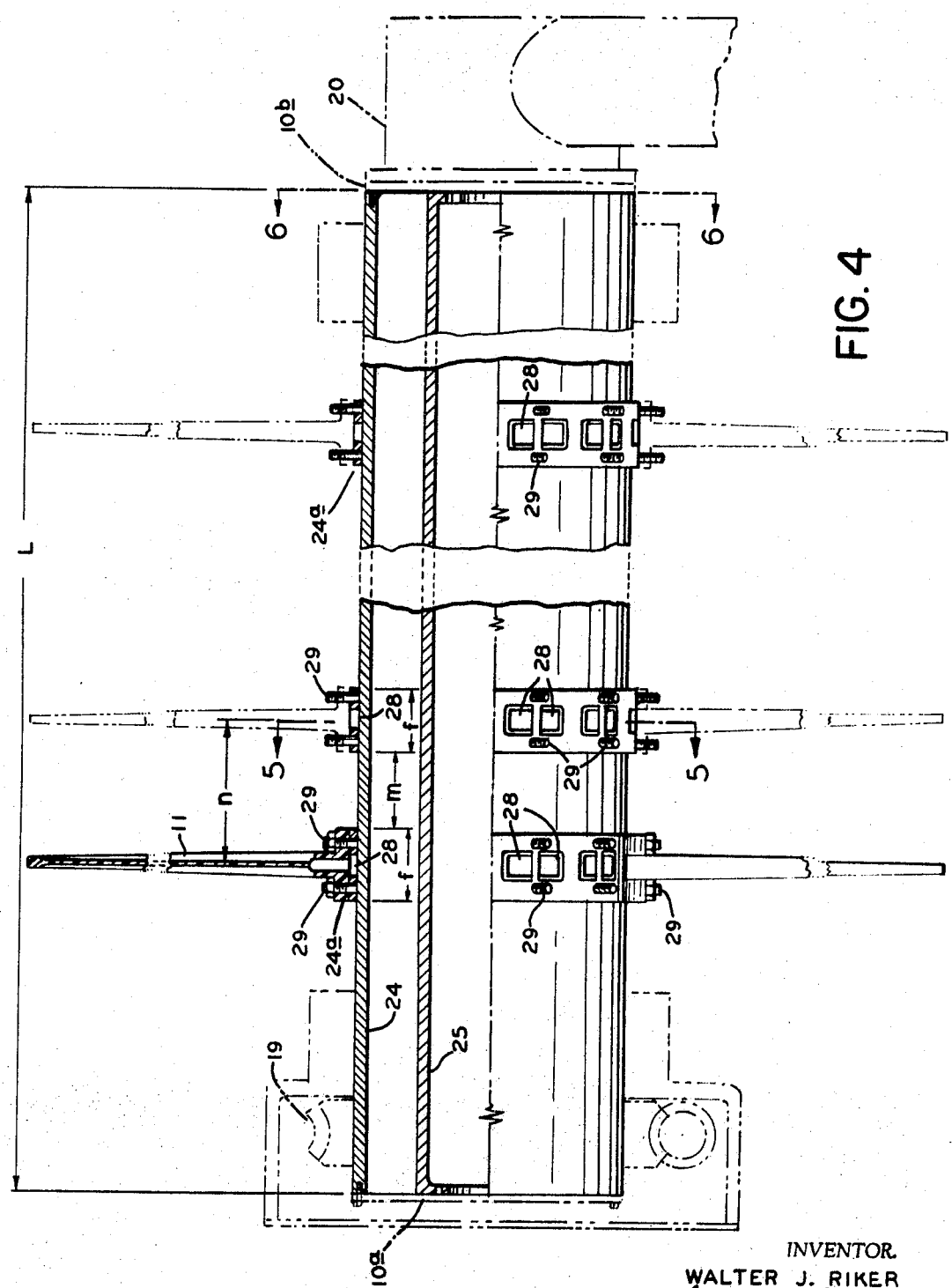

INVENTOR.
WALTER J. RIKER
BY Theodore M. Jablow
ATTORNEY.

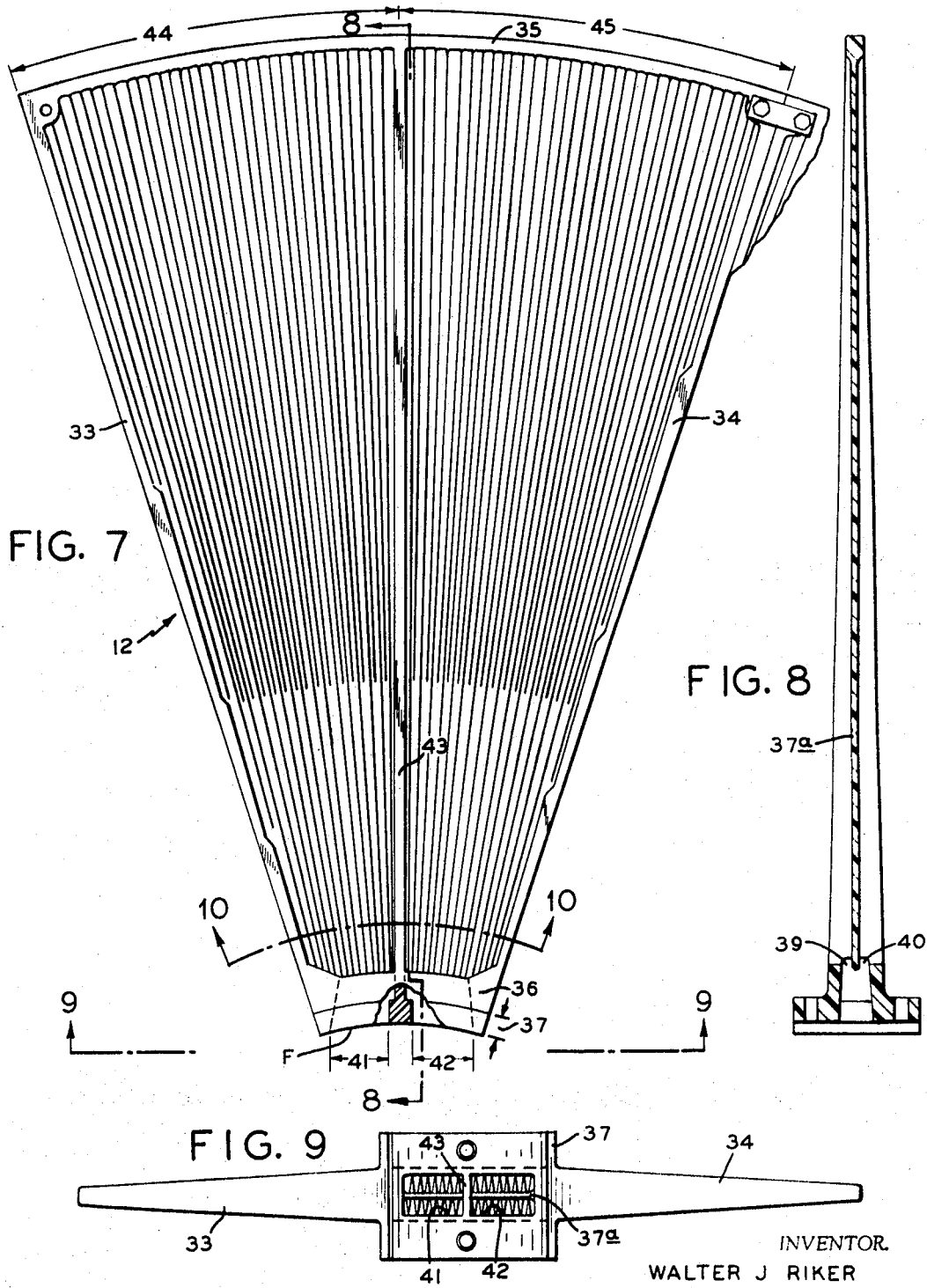

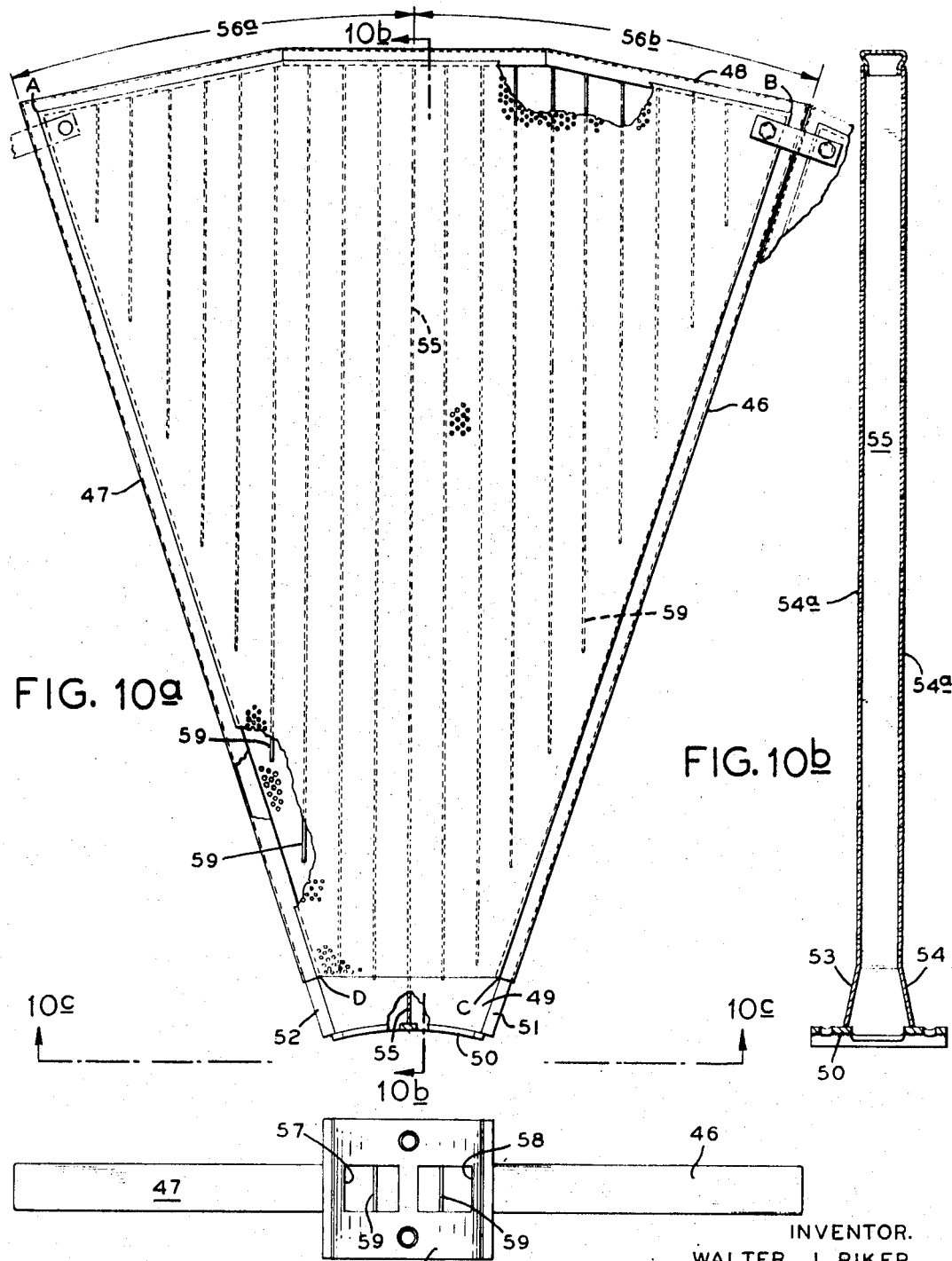

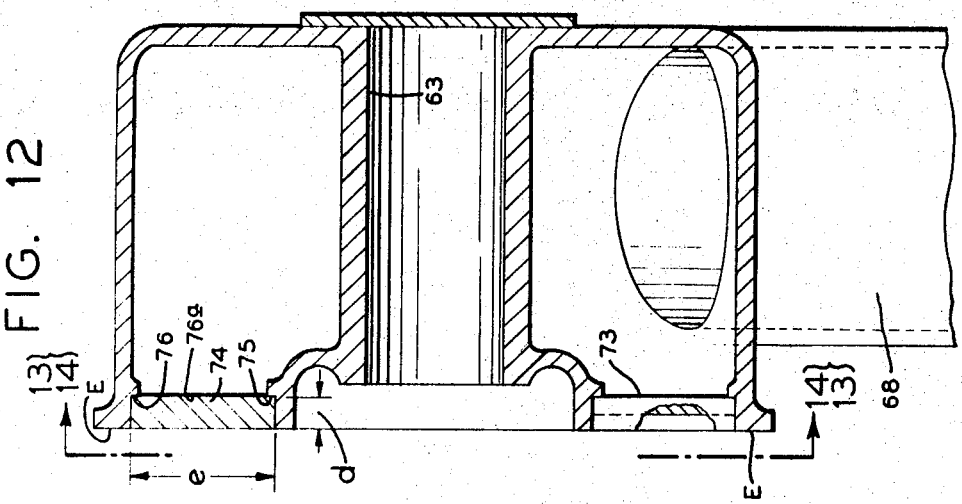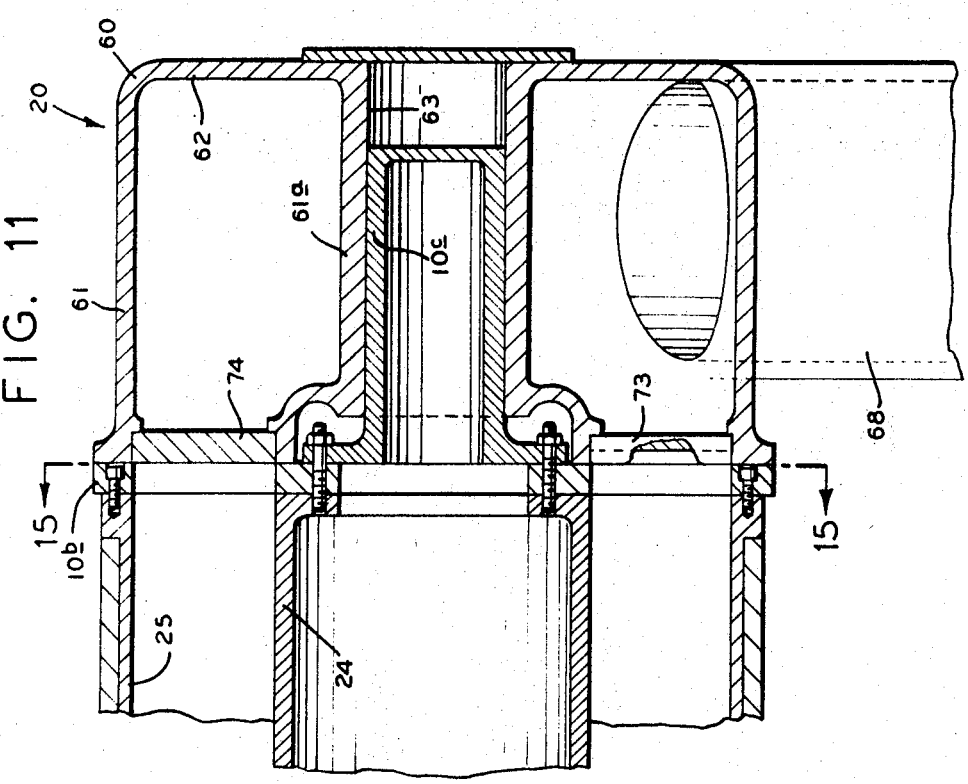

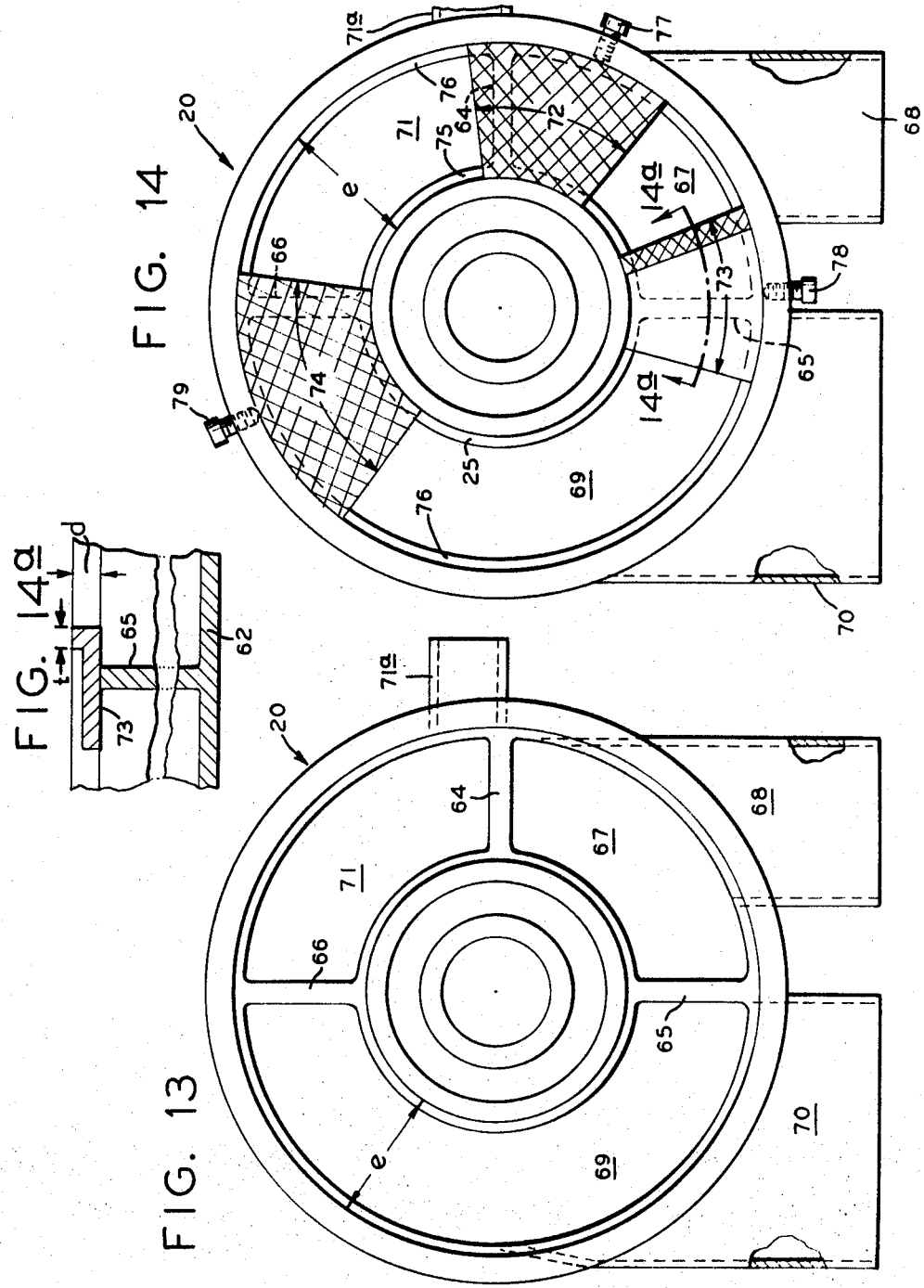

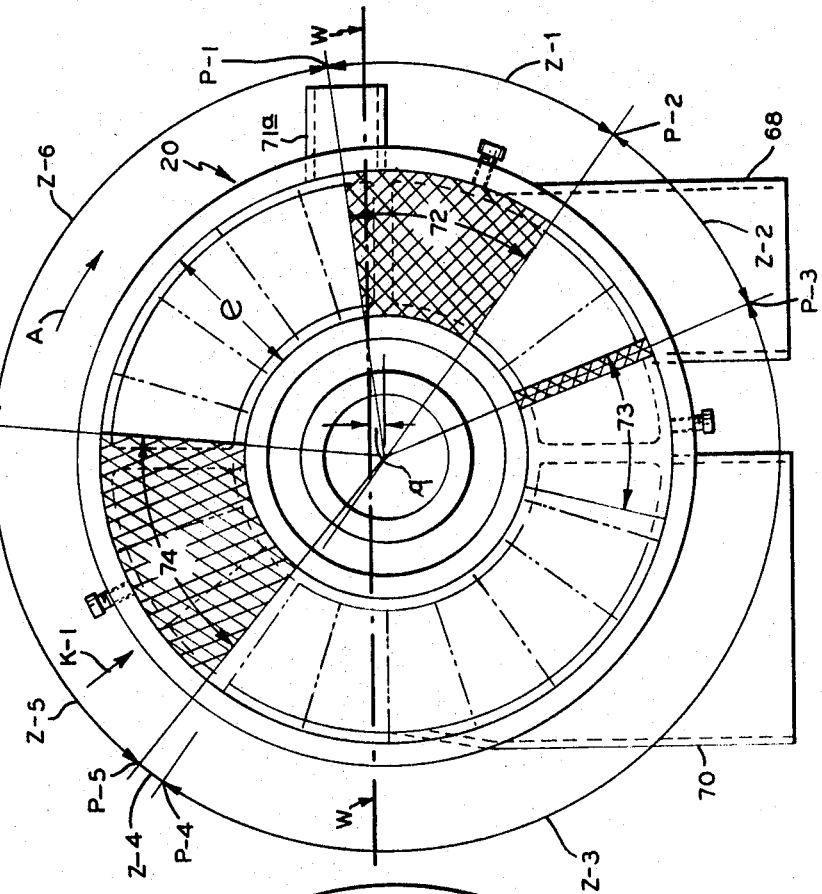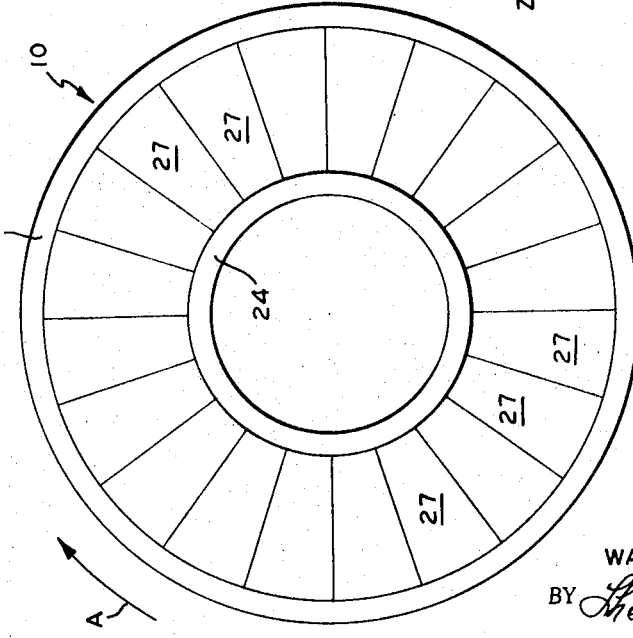

Oct. 7, 1969   W. J. RIKER   3,471,026
CONTINUOUS ROTARY DISC FILTERS
Filed Dec. 9, 1966   10 Sheets-Sheet 9

INVENTOR.
WALTER J. RIKER
BY Theodore M. Jablon
ATTORNEY.

United States Patent Office 3,471,026
Patented Oct. 7, 1969

3,471,026
CONTINUOUS ROTARY DISC FILTERS
Walter J. Riker, Westport, Conn., assignor to Dorr-Oliver
Incorporated, Stamford, Conn., a corporation of
Delaware
Filed Dec. 9, 1966, Ser. No. 600,542
Int. Cl. B01d 33/02, 33/00
U.S. Cl. 210—327                                    7 Claims

ABSTRACT OF THE DISCLOSURE

Rotary disc filter wherein each section of each disc has at least one radial partition functionally dividing the filtrate collecting space of one sector into at least two separate filtrate collecting chambers each of which communicates separately with the trunnion through the filter shaft carrying the discs.

---

In such filter the basic components comprise a vat, a series of filter discs mounted upon a hollow shaft the ends of which in turn are mounted in respective bearings supported upon respective end walls of the vat, drive means at one end for rotating the shaft, and a trunnion valve which may be at the other end effective to control the filtration cycle incident to the rotation of the filter disc assembly on the shaft.

Each filter disc is composed of a number of sectors individually mounted on the shaft. Each sector communicates with the control valve through a respective longitudinal duct provided within the shaft. Corresponding sectors of a plurality of discs thus communicate with the same longitudinal duct.

The control valve applies suction from a barometric leg to the filter sectors while submerged in the body of pulp in the vat during the cake forming phase of the filtration cycle. Filtrate liquid from the interior of the submerged sectors passes through the respective longitudinal ducts in the shaft and through the valve for discharge into the barometric leg. After complete emergence of each sector, the cake thereon must be dislodged from the filter media into respective delivery chutes provided between the discs, and formed by recesses in the respective side wall of the vat.

The vacuum must be controlled or blocked by the valve in relation to the cake discharge zone after emergence as well as in relation to the re-submergence of the filter sectors, this in view of the fact that the vacuum must not be broken incident to the removal of the filter cake from the filter media. Nor must the vacuum be re-applied until at least after each filter sector has become fully re-submerged. Furthermore, the operation should be controlled in such a manner that substantially all the filtrate liquid is drained or swept from the interior of the filter sectors and from the ducts before re-submergence is initiated.

It will be understood that the timing or location of the various phases in the operating cycle are governed largely by the number of filter sectors constituting a filter disc, and by the diameter of the filter discs, as well as by the speed of rotation of the discs, which factors must be related and functionally correlated to one another. However, the number of sectors for a given disc diameter is limited for structural and economical reasons. Yet, a larger number of sectors may be desirable for the purpose of attaining operational flexibility in timing the operating phases relative to filter operating speed, as well as for attaining a maximum of filter cake capacity in terms of productive cake forming filter area operating in the pulp. Heretofore, ten such individual filter sectors have been found to be a compromise between such contradictory requirements.

Another problem is encountered especially where the disc filter serves for the dewatering of a suspension of fibrous material, such as the dewatering of the "white water" derived from the paper-making Foudrinier machines. In that capacity the disc filter is said to operate as a "Save-all," and the difficulty lies in getting the fibrous matted and coherent filter cake properly separated from the filter media and discharged into the chutes within the limits and requirements of the operating cycle and in relation to the operating speed.

The operation of the "Save-all" such as herein shown to illustrate the invention, requires that a large volume of water be removed as filtrate liquid for re-use, while fibers are reclaimed as filter cake formed on both sides of the filter discs. This filter cake is of the kind wherein the interlocking fibers constitute a coherent mat that must be dislodged or peeled off by means of a water jet or "hydraulic knife" directed at the interface between the filter media and the matted cake, and preferably applied at the ascending side of the discs. Since the point of application of the jet is critical (for reasons hereinafter to be explained) the "hydraulic knife" is adjustable along the periphery of the filter discs.

Thus, the matted cake structure will tend to peel off the filter media in large sector-shaped slabs substantially corresponding to the size of the filter sectors. Adequate spacing must be provided between the discs for the discharge chutes to receive the slabs, contributing to the overall length of the discs assembly.

Unless critically timed within the requirements of the operating cycle, the load of fibous cake material discharging from two mutually adjoining discs into the interposed chute may clutter up and congest the space available for discharge, or part of the material may miss the discharge area of the chute and fall back into the vat, thus unduly thickening the feed pulp and upsetting the filtration operation.

For example, if the cake discharge zone on the ascending side is too high, then part of the cake material may be carried beyond the shaft of the disc assembly back into the pulp at the opposite side of the vat. Indeed, that condition may develop or become aggravated whenever the filter speed is increased temporarily in response to fluctuation in the plup feed supply.

On the other hand, if the cake discharge zone on the ascending side is too low, then proper drainage of filtrate liquid from the sectors is not attainable.

But even with the best of timing adjustment of the valve, because of the aforementioned nature and size of the sections of filter cake to be dislodged from the media, congestion may occur at the discharge chute along with passage of some of the cake material past the sides of the chutes into the vat, or increased filter speed may carry some cake material over into the other side of the vat, or an accumulation of discharging cake material may form adjacent to or upon the shaft.

Furthermore, in the "Save-all" type of disc filter provision is made in the cake formation phase of the operating cycle for separating the initial cloudy filtrate liquor through a first barometric leg, and separating the subsequent clear filtrate through a second barometric leg. Even though adjustable bridge means are usually provided in the trunnion valve for proportioning these filtrate zones relative to each other, a problem is due to the fact that functionally these zones will overlap causing a loss of clear filtrate into the cloudy liquor discharge, since the clear liquor must displace the initial cloudy liquor from the interior of the machine. The extent of this loss is dependent upon the extent of the cloudy filtrate zone or number of filter sectors in the disc.

It is among the objects of the invention to provide inexpensive and positive means for attaining improved cake discharge conditions that will avoid the aforementioned previous cake discharge difficulties. More specific objects are to initiate cake discharge at the ascending side at a relatively low and safe or non-critical point, to provide for effective and improved filtrate drainage, and furthermore to dislodge the filter cake more expeditiously. Measures to that effect would make a relatively larger zone potentially available for cake discharge so that the point of cake discharge could be located most favorably and as compatible with the requirement of effective filtrate drainage from the sectors of the discs and enable the machine to absorb increases in filter speed without adversely affecting the cake discharge conditions. Such measures also would allow for larger disc diameters without impairment of the cake discharge conditions.

Another object is to inexpensively increase the filter capacity in terms of active filter area to be available in the pulp.

Another object is to render the filtration cycle in a disc filter more flexible with respect to the location, extent, and timing of the various phases of the cycle, beyond the limitations heretofore inherent in the operation of the "Save-all" type or the like machines.

Another object is to provide a rotary disc filter of greater design flexibility as regards the choice of the number of filter sectors, and of the diameter of the filter discs, relative to another, and relative to the rotary speed of the disc assembly.

Still another object is to improve the operation of the filtration cycle in the "Save-all" type of machine, so as to minimize the aforementioned functional overlap between the cloudy and clear filtrate zones, for producing a minimum volume of cloudy filtrate as against a maximum volume of clear filtrate.

According to the invention, the foregoing objects are attainable with no more, and possibly with less than, the conventional number of filter sector elements, by subdividing each sector internally by radially extending partitioning means. In this way, there are created within each individually mounted sector element at least two smaller or half-size sector compartments edgewise adjoining one another. Each such compartment has its own separate drainage opening at the narrow or constricted end of the sector element, communicating with a corresponding separate longitudinal duct formed in the shaft. Consequently, each such compartment is subject individually to the filtration cycle controlled by the valve.

Preferably, the invention is embodied in the "Save-all" type of operation wherein the filtration cycle as determined by the valve comprises (starting at the point of immersion at the descending side and proceeding in the direction of rotation) the following operating phases or zones:

(1) A first neutral zone on the descending side, where communication to vacuum is closed, allowing initial cloudy filtrate liquid to percolate through the filter media into the respective sectors and connected horizontal ducts, while laying down on the media an initial cake layer of fibrous material;

(2) A first vacuum zone still on the descending side, drawing additional cloudy filtrate liquid into a first barometric leg until additional cake material has collected and the filtrate liquid begins to run clear;

(3) A second vacuum zone occupying a minor portion of the descending side and a major portion of the ascending side, drawing what is now clear filtrate liquid through a second barometric leg while further adding to the thickness of the filter cake, which vacuum is effective until the sector has ascended to an emerged position sufficiently high or inclined to insure proper filtrate drainage;

(4) A discharge zone which is a continuation of the preceding vacuum zone brief enough to momentarily allow inrushing air to sweep out residual filtrate liquid from the respective sector compartment but not from the associated duct (this residual plug of liquid in the duct protects the operation of the barometric leg).

(5) A second neutral zone terminating the air sweep and extending through the balance of the ascending side with vacuum communication closed;

(6) A gravity drainage zone substantially occupying the upper quadrant of the descending side, allowing for final drainage of the residual plug of clear residual filtrate liquid to pass from the ducts via the valve into the clear filtrate well, prior to the sector re-entering the initial or first neutral zone.

It is one of the advantages flowing from this invention that due to the functional subdivision into a larger number suitable smaller filter compartments the air sweep applied to the above indicated cake discharge zone (4) is rendered more rapid, positive, and effective, as well as more readily controllable.

A further advantage is that the dislodgement and discharge of the much smaller sector-shaped slabs of fibrous cake material from the respective filter compartments can be effected more expeditiously and efficiently, thereby further alleviating the cake discharge problem above set forth, and allowing for a shorter period of cake discharge under favorable filtrate drainage conditions. Also made possible potentially under these conditions are narrower discharge chutes and thus a reduction in the overall length of the disc assembly.

Other features and advantages will hereinafter appear.

FIG. 1 is a side view of a rotary disc filter of the type embodying the invention, having the drive at one end, and a trunnion valve at the other end of the filter shaft and disc assembly;

FIG. 2 is a plan view of the disc filter taken on line 2—2 in FIG. 1;

FIG. 3 is a cross-sectional view taken on line 3—3 in FIG. 2, with the filter media on one of the filter sectors broken away to show novel subdivision of a filter disc into a larger number of sector-shaped filter compartments;

FIG. 4 is an enlarged longitudinal part-sectional detail view of the filter shaft- and disc-assembly taken from FIGS. 1 and 2;

FIG. 7 is a detail view of one embodiment of the filter sectors of integral molded construction partitioned into smaller sector-shaped compartments;

FIG. 8 is a vertical longitudinal sectional view of the filter sector, taken on line 8—8 in FIG. 7;

FIG. 9 is an end view of the narrow end of the filter sector, taken on line 9—9 in FIG. 7 also showing the partition means;

FIG. 10a shows another embodiment of the filter sector of composite fabricated construction;

FIG. 10b is a longitudinal sectional view taken on line 10b—10b in FIG. 10a;

FIG. 10c is a view upon the narrow end of the filter sector of FIG. 10a;

FIG. 11 is a greatly enlarged vertical sectional view of the trunnion valve arrangement, showing the stationary valve box and bridge blocks cooperating with the rotary filter shaft;

FIG. 12 shows the trunnion valve box and bridges detached from the filter shaft;

FIG. 13 is a view of the open side of the valve box, taken on line 13—13 in FIG. 12, with the bridge blocks omitted, to show radial partitioning of the box;

FIG. 14 is a view similar to FIG. 13, with the bridge blocks in position;

FIG. 15 is a diagrammatic end view of the filter shaft taken on line 15—15 in FIG. 11;

FIG. 16 is a view similar to FIG. 14, combined with FIG. 15, and showing the operating zones of a filter cycle.

Figure 5:
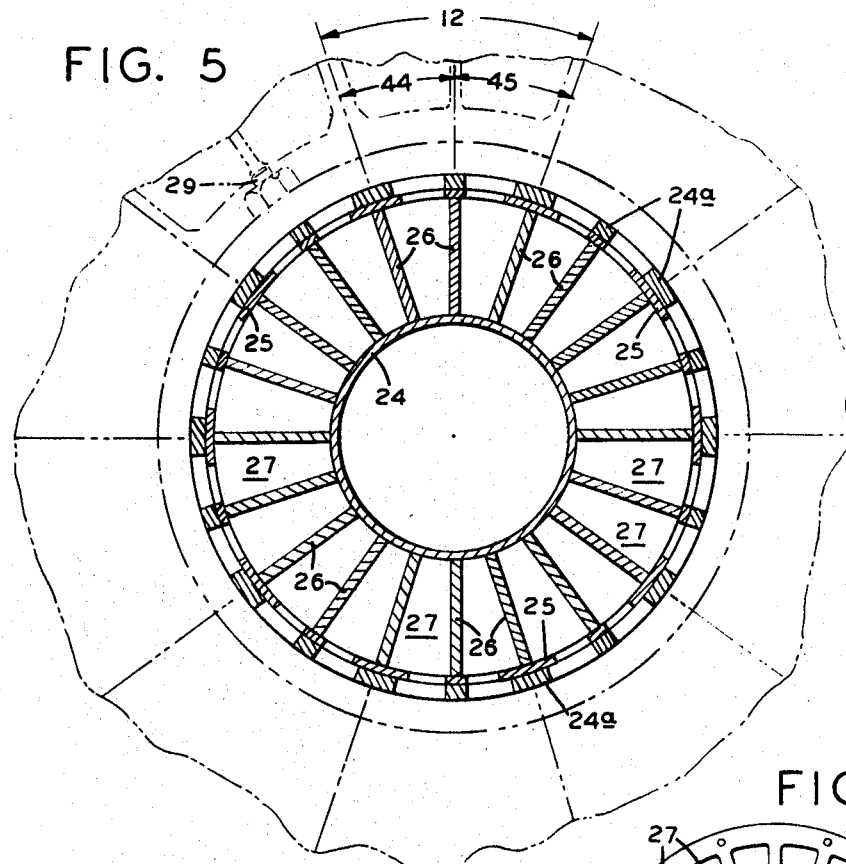
FIG. 5 is a cross-sectional view of the filter shaft and disc assembly taken on line 5—5 of FIG. 4.
Figure 6:
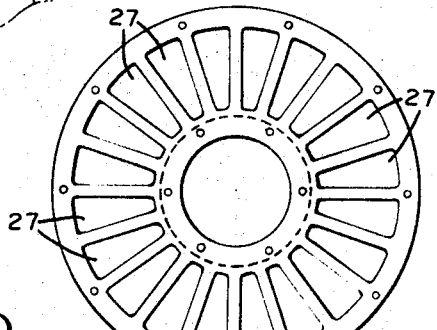
FIG. 6 is an end view of the filter shaft taken on line 6—6 in FIG. 4.
Figure 10:
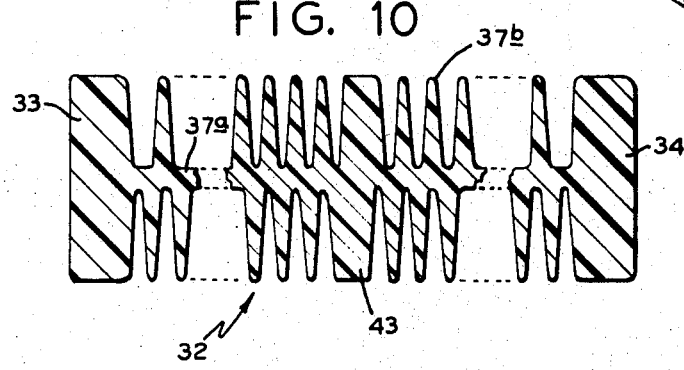
FIG. 10 is a greatly enlarged cross-sectional view of the filter sector, taken on line 10—10 in FIG. 7, also showing the partitioning means.

An example of the type of continuous rotary disc filter embodying the invention is illustrated in FIGS. 1, 2, 3. In the preferred form herein shown and described this machine is applicable advantageously for dewatering a suspension of fibrous material such as the so-called "white water" derived from the paper making Foudrinier machines. The resulting filter cake containing the recovered fibers is returned to the stock chest, while the cloudy filtrate- and the clear filtrate fractions provide process water at respective suitable points in the flowsheets of the pulp-treating and paper-making plan.

In this machine a horizontal hollow filter shaft 10 of length L carries an assembly of filter discs 11 spaced from one another. Each disc in turn consists of filter sectors 12 individually mounted on the shaft. Each sector according to the invention has a median radial partition P dividing the interior of the sector into a pair of smaller sector shaped compartments or filter chamber so cells 12a edgewise adjoining one another, and operating individually in a manner further to be described.

Roughly, the lower half of the discs is immersed in the pulp contained in a vat 13 having a pulp feed connection 14. The ends of shaft 10 are mounted for rotation in respective journal bearings 15 and 16 supported upon the end walls 17 and 18 respectively of the vat.

Worm drive means 19 for rotating the disc assembly are provided at one end of the shaft for rotation in the direction of arrow A. The other end of the shaft has a stationary trunnion valve 20 communicating through respective ducts in the shaft with respective sector compartments 12a of the discs. At the ascending side of the rotating discs the vat is formed with discharge chutes 13a for the filter cake being stripped from the discs by the devices 20a.

The trunnion valve 20 is connected to a first barometric leg 21 for discharging cloudy filtrate liquor into a cloudy filtrate liquor well, and to a second barometric leg 22 for discharging clear filtrate liquor into a clear filtrate liquid well, and has a lateral gravity discharge connection 23. The ducts in the shaft convey the respective filtrate fractions to the valve and thus into the respective liquid discharge connections thereof incident to the rotation of the disc assembly, all as will be furthermore explained.

Each filter disc is provided with a cake dislodging device 20a, the so-called "Hydraulic Knife" located at the periphery of the ascending side of the disc. Such a device applies a jet of water directed at the interface between the filter media and the matted cake for dislodging the same, and its position is adjustable forwardly or rearwardly along the periphery of the disc, as indicated by support structure 20b for mounting these devices upon the vat, and also indicated by the arrows D in FIG. 1.

Referring to FIG. 4, the hollow filter shaft of length L comprises two concentric tubular members 24 and 25 of equal length. The annular space between these tubular members is evenly subdivided by radial longitudinal partitions 26 extending from end to end of said shaft, and constituting between them longitudinal ducts 27 the number of which is double the number of said individual filter sectors 12 or equal to the total number of said smaller sector shaped coupartments 12a thereof. The filter discs each occupy a peripheral zone of the width f on the shaft, provided with flow passage openings 28 registering with respective filtrate outlet openings of respective sector compartments 12a whereby each of the compartments 12a of a disc communicates with a respective longitudinal duct 27 in the shaft. The zones f are spaced from each other a distance m such that the distance n between the filter discs is sufficient to accommodate between them the cake dischage facilities or discharge chutes. Each zone f has an annular reinforcement 24a around the outer tube member 24, providing the peripheral base for mounting the filter sectors 12 and for accommodating anchoring studs 29 therefor.

An end plate 10a closes the drive end of the filter shaft, while the opposite end has fixed thereto a detachable wear plate 10b with openings that register with the ducts in the shaft, as well as a trunnion 10c (see also FIG. 11) for centering and supporting the stationary trunnion valve. The location of bearings 15 and 16, worm gear 19a, and trunnion valve 20 are indicated in dot-and-dash.

Referring further to FIGS. 7, 8, 9 10, the filter sector 12 of this invention may be in the form of an integral molded structure 32, comprising radial frame portions 33 and 34, an outer arcuate peripheral frame portion 35, an inner arcuate frame portion 36 having a saddle-shaped flange 37 fitted to the contour of the filter shaft. The frame portions 33, 34, 35 surround, and are integral with a sector-shaped web portion 37a (see FIG. 8) formed with radial ribs 37b providing the grid means for supporting the filter media indicated at 38 in FIG. 3. Filtrate drainage from both sides of the web portion 37 and along the ribs is provided for inasmuch as filtrate may flow from the sector through passages 39 and 40 (see FIG. 8) at the ends of the web portion and of the ribs. These passages communicate with discharge passages 41 and 42 provided in the saddle-shaped end portion 36. The passages 41 and 42 are separated from each other by a radial partition 43 integral with the web portion (see also FIG. 10) and extending from the convexly arcuate face F of the saddle-shaped partition to the outer arcuate frame portion 35 merging therewith. The sector 12 is thus functionally subdivided into a pair of smaller sector-shaped compartments 44 and 45 substantially without loss in available filter area.

FIGS. 10a, 10b, 10c represent another form of the filter sector embodying the invention, namely a fabricated composite construction wherein the component elements are welded together. The sector-shaped frame of this construction comprises radial side members 46 and 47 of channel shaped profile, a composite outer arcuate member 48 of similar channel-shaped profile interconnecting the outer ends of the side members, a saddle-shaped hollow box-shaped end portion 49 interconnecting the inner converging ends of the side members. This hollow end portion in turn comprises a saddle-shaped flange plate 50, inwardly convergent end walls 51 and 52 aligned with respective radial side members 46 and 47, and outwardly convergent side walls 53 and 54. To each side of this frame is welded a sector-shaped perforated plate 54a defined by its corner points A, B, C, D. The space between these perforated plates is subdivided by a radial partition 55 dividing the sector into a pair of smaller sector-shaped filtration chambers 56a and 56b having separate filtrate discharge openings 57 and 58 provided in the saddle-shape flange plate 50. Additional spacer plates or ribs 59 extending parallel to partition 55 provide a rigid backing for the perforated plates while also rigidifying the sector construction as a whole.

Referring to FIGS. 11, 12, 13, 14 the body of the stationary trunnion valve 20 is in the form of an annular valve box 60 comprising an outer cylindrical wall 61, an inner cylindrical wall 61a concentric with the outer wall, and an annular outer end wall 42 rigidly interconnecting these concentric walls. The central opening 63 in this box provides a bearing surface for the trunnion 10c of the filter shaft, centering the stationary valve box relative to the rotating shaft, and thus maintaining the annular inwardly facing open end of the valve box cooperative with the ducts 27 in the shaft.

The filtration cycle of the machine is determined by the arrangement of certain radial partitions associated with adjustable bridges in the box which has discharge connections for delivering various filtrate liquor fractions obtainable by this partitioning arrangement.

In the present example, for the purpose of establishing a filtration cycle suited for the economical de-watering of a fibrous pulp or "white water," the annular valve box (see FIG. 13) has three radial partitions, namely a lateral partition 64 pointing towards the descending side of the filter discs, a lower partition 65 pointing substantially downwardly, and an upper partition 66 pointing substantially upwardly.

A first section or valve chamber 67 between partitions 64 and 65 is maintainable under a vacuum by a first barometric leg connection 68, receiving and discharging a cloudy filtrate fraction. A second section or valve chamber 69 between partitions 65 and 66 is maintainable under a separate vacuum by a second barometric leg connection 70 receiving and discharging a clear filtrate fraction. A third section or valve chamber 71 between partitions 66 and 64 is arranged for gravity discharge of whatever residual clear filtrate liquid may have remained in the ducts through lateral discharge connection 23, all as will be furthermore set forth.

The actual timing of the various phases of the filtration cycle is determined by the provision (see FIG. 14) of adjustable blank-off bridges 72, 74 and an adjustable partition bridge 73, associated with respective partitions 64, 65, and 66. The timing must also be related to the height of the pulp level W in the vat. While the pulp feed supply to the vat may fluctuate, in this type of filter the pulp level is maintainable substantially constant through automatic controls that will either slow down or accelerate the rotation of the filter shaft in response to such fluctuations.

The bridges are slidably fitted into an annular groove of depth $d$ and width $e$ formed at the open end of the valve box, and presenting a pair of opposedly arranged annular shoulders 75 and 76 co-planar with the edge faces 76a of the radial partitions in the box. The outer faces of the bridges indicated by double cross-hatching are co-planar with the end face E of the box, mating with the wear plate 10b of the filter shaft. The bridges are secured in adjusted position by respective set screws 77, 78, and 79.

The blank-off bridges 72 and 74 are in the form of solid sector-shaped blocks of equal thickness with the effective blank-off area indicated by double cross-hatching.

The intermediate partition bridge 73 (see FIG. 14a) has L-shaped cross-sectional configuration with no effective blank-off area except the thickness $t$ of the short shank of the L-shape, which thickness need not be greater than the thickness of the associated radial partition 64 of the box, so that any adjustment of this bridge will merely have the effect of functionally changing the position of the radial partition 65 and thus changing the extent of the adjoining vacuum operating zones Z-2 and Z-3 relative to each other, and furthermore described below.

As herein illustrated, the nature and timing of the filter operating cycle of this example is governed by the dimensions and the locations of the bridges 72, 73, and 74 in the valve, cooperating with the ducts 27 of the filter shaft. Accordingly, the ducts of FIG. 15 are also indicated in, or superimposed upon the valve of FIG. 16, in dot-and-dash. For a ready understanding of this filtration cycle relative to the invention, FIG. 16 had best be considered together with FIG. 18 which latter illustrates the cycle diagrammatically in terms of rotation of the filter discs, resulting in the improved filter cake discharge conditions as well as other improvements and economies attainable by this invention.

Figure 17:
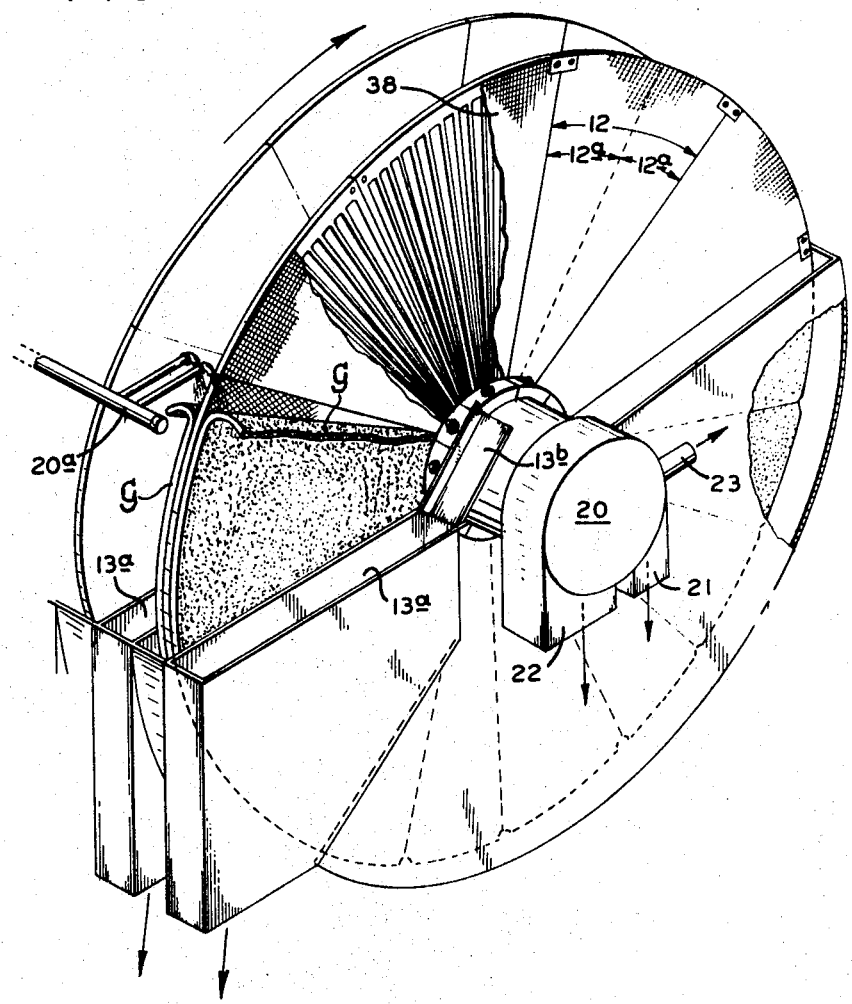
FIG. 17 is a perspective view of a portion of the disc filter, illustrating the manner of dislodging a matted filter cake by means of an adjustable jet spray device at the ascending side of the filter disc, and with filter media broken away to show partitioning of the filter sectors.
Figure 18:
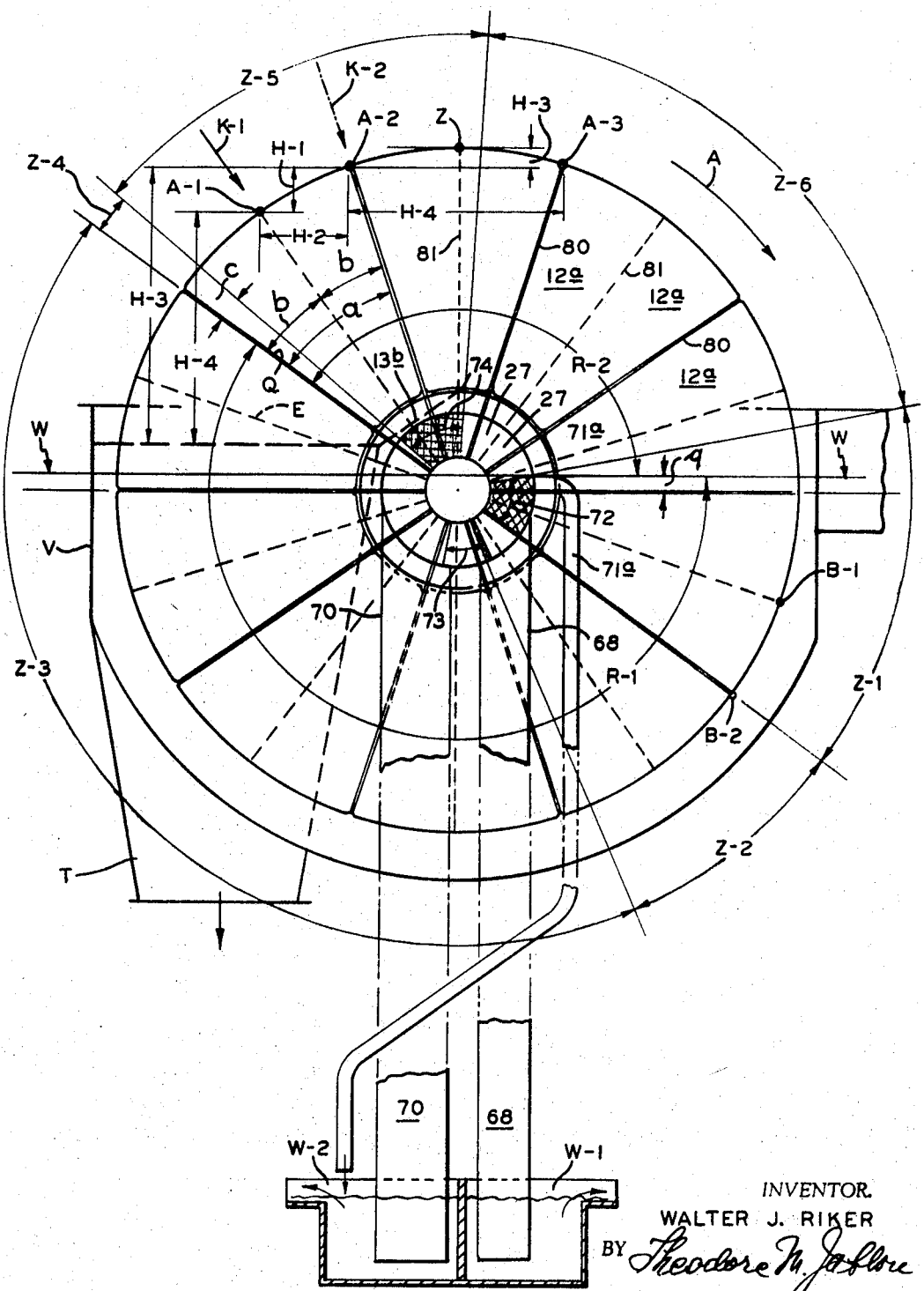
FIG. 18 is a diagrammatic vertical cross-sectional view of the disc filter, illustrating improvements in a filtration cycle according to the invention.

In the example of FIG. 18 ten sectors constituting a disc are indicated by radial lines 80, while the subdivisions therein are marked by dotted lines 81, so that each sector defined by the enclosed angle $a$ contains the two sector chambers defined by the enclosed angle $b$. Also indicated is the vat provided with the cake discharge chutes T at the ascending sides of the filter discs. Each chute (see also FIG. 17) has an inclined guide baffle 13b for guiding any fragments of filter cake material away from the shaft and into the chute. The pulp level W is shown a distance $q$ above the horizontal axis of the filter drum.

The filtration cycle as exemplified in FIG. 16 for operating the invention is defined by operating points P-1, P-2, P-3, P-4, P-5, P-6, which points in turn define between them operating zones Z-1, Z-2, Z-3, Z-4, Z-5, Z-6, identically indicated also in FIG. 18. At the beginning of the cycle the filter chambers 12a and ducts 27 being empty and completely vented move from zone Z-6 (in direction of arrow A) down into the blank-off zone Z-1 which begins at point P-1 located slightly above pulp level W, and extends downwardly to point P-2 thus providing a blank-off area here shown to be slightly in excess of the combined area of any two mutually adjoining ducts. As the ducts pass through this blank-off area indicated by double cross-hatching, the corresponding filter chambers enter into and become submerged in the pulp, allowing initial cloudy filtrate liquor percolating through the filter media to gradually fill up the ducts as well as the filter chambers, while gently depositing upon the filter media an initial layer of the fibrous material. As soon as enough of this fibrous layer is formed, it will also intercept the fine turbidity particles in the pulp so that only clear filtrate will percolate. As soon as the ducts leave this blank-off area of bridge 72 and, moving past point P-2, enter the zone Z-2, they are subject to the vacuum effect of the first barometric leg 68 drawing clear filtrate liquid into the respective valve chamber 67, thus causing the initially trapped cloudy filtrate to be displaced from the system through the valve into the associated barometric leg 68 which terminates in the cloudy filtrate liquor well W-1.

Then, as the ducts move past point P-3, across partition bridge 73 into zone Z-3, clear filtrate liquid will continue to be drawn into the respective filter chambers of the disc for delivery through valve chamber 69 into the second barometric leg 70 and into the associate clear filtrate well W-2, while filter cake continues being formed from the pulp. Stripping of the filter cake from the filter media cannot be started until an ascending filter chamber is fully emerged and reaches a position where its trailing side E is sufficiently inclined for proper filtrate drainage, and for delivery of the filter cake into the chutes.

Thus, when the trailing edge E of the ascending filter chamber 12a with the filter cake thereon will have reached the end of vacuum zone Z-3, the jet device or hydraulic knife indicated by arrow K-1 at Point A-1 will start dislodging or unpeeling from the filter media a sector-shaped slab of coherent cake material of the size of the filter chamber, in the manner illustrated in FIG. 17. Dislodging of one such slab G will have been completed during the time that it takes for the ascending upper corner of the filter chamber to move from point A-1 approximately to point A-2, during which time the sector-shaped slab of cake material will have dropped into the associated discharge chute. During that time, the upper corner of the filter chamber will have moved a vertical distance H-1 upwardly and a horizontal distance H-2 laterally towards the vertical center line of the filter shaft.

Moreover, dislodging or stripping of the filter cake ought not to be effected until residual clear filtrate liquid in the filter chamber will have been purged so as to avoid its re-wetting the filter cake. Such purging is effected in the narrow zone Z-4 of exposed filter media at the trailing side Q of the filter chamber, which zone admits a short blast of atmospheric air between points P-4 and P-5 (see FIG. 16) until shut-off by the blank-off bridge 74. The timing of this short purging blast is related to the cake removal in such a way that, while the filter chamber itself is purged, a plug of residual clear filtrate liquid remains in the respective duct 27, acting as a seal against efficiency collapse of the connected barometric leg 70. This timing, therefore, is dependent upon the position of the cake dislodging device K–1 which is closely adjustable forwardly or backwardly on its stationary support (see FIG. 3).

From FIGS. 16 and 18 will be seen that the jet device is positioned ahead of the purging zone Z–4, thus accounting for the manner in which the slab or blanket of fibrous filter cake material is being dislodged or peeled off the filter media as illustrated in FIG. 17. Accordingly, by adjusting the jet device forwardly or rearwardly, a suitable operating point can be found where the filter chamber 12a itself will be fully purged, while the residual plug of clear filtrate liquid remains in the associated duct 27 until such time that the duct will have moved through and past the area of the blank-off bridge 74 or zone Z–5 and into the aforementioned gravity discharge zone Z–6 where the filter chamber and duct are fully vented allowing the residual liquid to drain via lateral discharge connection 71a into the clear filtrate liquid recovery well W–2.

By comparison (see FIG. 18), for the undivided filter sector, having the same drainage slope Q, the cake dislodging jet device would have to be located much higher at point A–2 as indicated by arrow K–2 in dot-and-dash, in which case the cake dislodging operation would not be completed until the upper corner of the sector had moved from point A–2 past the zenith Z to point A–3 located unfavorably past the vertical center line of the shaft. During that time the upper corner would have moved a vertical distance H–3 upwardly, and a horizontal distance H–4 laterally, which time may be insufficient for the correspondingly larger sector-shaped slab of cake material to be unpeeled and properly dropped into the associated discharge chute.

Functionally, subdividing the basic disc sectors in the manner of this invention (see FIG. 18) produces the further advantages of minimizing the combined extent of the cloudy liquor filtration zones Z–1 and Z–2 and reducing the amount of cloudy liquor itself to one-half of what it would be for the individual filter sector, while correspondingly increasing the extent and effectiveness of the clear vacuum filtration zone Z–3.

In FIG. 18, the arc or segment R–1 represents the extent substantially to which the filter area of a disc is blanketed by filter cake, substantially comprising the zones Z–1, Z–2 and Z–3, whereas arc R–2 designates the complementary area of exposed filter media substantially comprising the zones Z–5 and Z–6.

In view of the filter operating cycle above set forth in connection with FIGS. 16, 17, 18, it is seen that the invention with a small number of filter sections provides improved cake discharge conditions in the sense that the slabs of fibrous filter cake material reduced in size may be dislodged from the filter media readily and expeditiously so they will enter the chutes within a suitably positioned and timed discharge zone. This in turn allows for the effect of filter speed increases or fluctuations to be absorbed without fragments of filter cake material re-entering the body of pulp in the vat. Yet, the invention also provides for establishing a favorable filter drainage angle for the filter cells. The invention furthermore provides improvements in the operation of the zones of submergence, that is the cake formation zones, by minimizing the cloudy filtrate liquor volume, while correspondingly increasing the clear filtrate volume, as well as the cake formation capacity under vacuum of said filter disc.

We claim:

1. In a continuous disc filter, a rotary filter disc assembly which comprises a filter disc composed of filter sector elements each of which in turn comprises a sector-shaped frame structure surrounding a correspondingly sector-shaped filtrate collecting space, and having radially extending side portions, an arcuate outer end portion rigidly interconnecting said side portions, a saddle shaped inner terminal portion interconnecting the converging ends of said side portions and shaped for seating upon a shaft, filter media covering each side of the frame structure, supporting grid means for backing said filter media while allowing for drainage of filtrate liquid through said filtrate collecting space and said inner terminal portion, and radial partitioning means extending from said outer arcuate portion to said inner terminal portion, thus subdividing said filtrate collecting space at least into a pair of sector-shaped smaller filtrate chambers edgewise adjoining one another, each said chamber having a separate drainage opening in said inner terminal portion; a hollow shaft comprising a tubular member containing longitudinal ducts equal in number to the sum total of said smaller chambers of all said sector-shaped filter elements, with individual flow passage openings provided in said tubular member, one for each said duct, said flow passage openings adjoining one another in a zone around said shaft, said flow passage openings being arranged to register with respective drainage openings of said smaller sector-shaped filtrate chambers, whereby communicating filtration flow passages are provided leading from each said smaller sector-shaped chamber to a respective associated longitudinal duct in said shaft; and means for detachably securing said sector-shaped frame structures in co-planar alignment with one another upon said shaft.

2. The assembly according to claim 1, wherein said shaft comprises an inner tubular member, an outer tubular member concentrically surrounding said inner tubular member so as to constitute therewith an annular space along the length of said tubular members, and radial partition walls rigidly interconnecting said tubular members, and subdividing said annular space into said longitudinal ducts.

3. The filter disc assembly according to claim 1, wherein said partitioning means in the filter sector elements and said radial partitions in said shaft have mating faces with respect to one another, substantially coinciding with the seating face of said free structure engaging said shaft.

4. The filter disc assembly according to claim 1, wherein said frame structure of the filter sector elements, said intermediate partitioning means in said frame structure, and said grid means are combined in an integrally molded structure.

5. The filter disc assembly according to claim 1, wherein said filter sector element comprises radially extending side members of channel shaped cross-sectional configuration an arcuate outer end member of similar cross-sectional configuration and rigidly interconnecting the outer ends of said side members, a saddle shaped terminal member rigidly interconnecting the converging ends of said side members and providing said flow passage means for the filtrate liquid, a sector-shaped perforated plate fixed endwise to one side of the frame structures, another sector-shaped perforated plate fixed edgewise to the opposite side of said frame structure, providing a sector-shaped filtrate collecting and drainage space between said perforated plates, and partitioning means extending from said arcuate member to said terminal member, for subdividing said filtrate drainage space into said smaller sector-shaped drainage spaces.

6. A continuous rotary disc filter for use in dewatering a suspension of fibrous material adapted to produce a matted filter cake, which comprises:

a rotary shaft- and filter-disc assembly having a filter disc composed of filter sector elements each of which in turn comprises a sector-shaped frame structure surrounding a correspondingly sector-shaped filtrate collecting space, and having radially extending side portions, an arcuate outer end portion rigidly interconnecting said side portions, a saddle shaped inner thermal portion interconnecting the converging ends of said side portions and shaped for seating upon a shaft, filter media covering each side of the frame structure, supporting grid structure for backing said filter media while allowing for drainage of filtrate liquid through said collecting space and said inner terminal portion, and radial partitioning means extending from said outer arcuate portion to said inner terminal portion, thus subdividing said filtrate collecting space at least into a pair of sector-shaped smaller filtrate chambers, each said chamber having a separate drainage opening in said inner terminal portion, and a hollow shaft comprising a tubular member containing longitudinal ducts equal in number to the sum total of said smaller chambers of all said sector-shaped filter elements, with individual flow passage openings, one for each said duct, provided in said tubular member, said flow passage openings adjoining one another in a zone around said shaft, said flow passage openings being arranged to register with respective drainage openings of said smaller sector-shaped filtrate chambers, whereby communicating filtration flow passages are provided between each said smaller sector-shaped chamber and a respective associated longitudinal duct in said shaft, and means for detachably securing said sector-shaped frame structures in co-planar alignment with one another upon said shaft;

a vat having end walls, bearing means upon said end walls for supporting the respective ends of said rotary disc assembly, and having cake delivery chutes at the ascending side of the discs;

a stationary discharge device located at the periphery of said filter disc and in the upper part of the ascending side thereof, for dislodging the matted cake by means of water jet;

a valve cooperating and communicating with the ends of said ducts at one end of said shaft in a manner to control the filter operating cycle incident to the rotation of said disc assembly, said valve comprising an annular valve box co-axial with said shaft, and providing an annular filtrate receiving space registering with the sum total of said ducts, and having radial partition means dividing said filtrate receiving space into operating sections which comprise a first vacuum section at the descending side of the disc assembly having a first barometric leg connection adapted to discharge cloudy filtrate liquor from said first vacuum section, and extending about from the 3 o'clock position of said disc assembly downward to a first point intermediate the 3 o'clock and the 6 o'clock position; a second vacuum section having a second barometric leg connection adapted to discharge clear filtrate liquor, and extending from the end of said first vacuum section up the ascending side of the assembly to about the 12 o'clock position, and a subsequent filtrate drainage section at the descending side occupy the balance of said annular receiving space and provided at its lower end with a gravity discharge connection for releasing residual clear filtrate liquid from said ducts, a first adjustable blank-off bridge located substantially in the upper end portion of said first vacuum section, providing an initial neutral zone for the filter compartments descending into the pump, a second adjustable blank-off bridge in the upper end portion of said second vacuum section providing a second neutral zone for the filter compartments after cake discharge, an adjustable partition bridge effective between said first and said second vacuum zones;

and means for adjusting the position of said cake discharge device for advancing or retarding the point of cake discharge relative to said second neutral zone.

7. The disc filter according to claim 6, wherein said shaft comprises an inner tubular member, an outer tubular member concentrically surrounding said inner tubular member so as to constitute therewith an annular space along the length of said tubular members, and radial partition walls rigidly interconnecting said tubular members, and subdividing said annular space into said longitudinal ducts.

References Cited

UNITED STATES PATENTS 3,193,105   7/1965   Putnam _____ 210—331

REUBEN FRIEDMAN, Primary Examiner

FRANK A. SPEAR, Jr., Assistant Examiner

U.S. Cl. X.R.

210—331, 332, 334, 347, 486